April 8, 1924.  
H. E. GILBERT  
VARNISH FIRE  
Filed Nov. 28, 1922  
1,489,757  
2 Sheets-Sheet 2
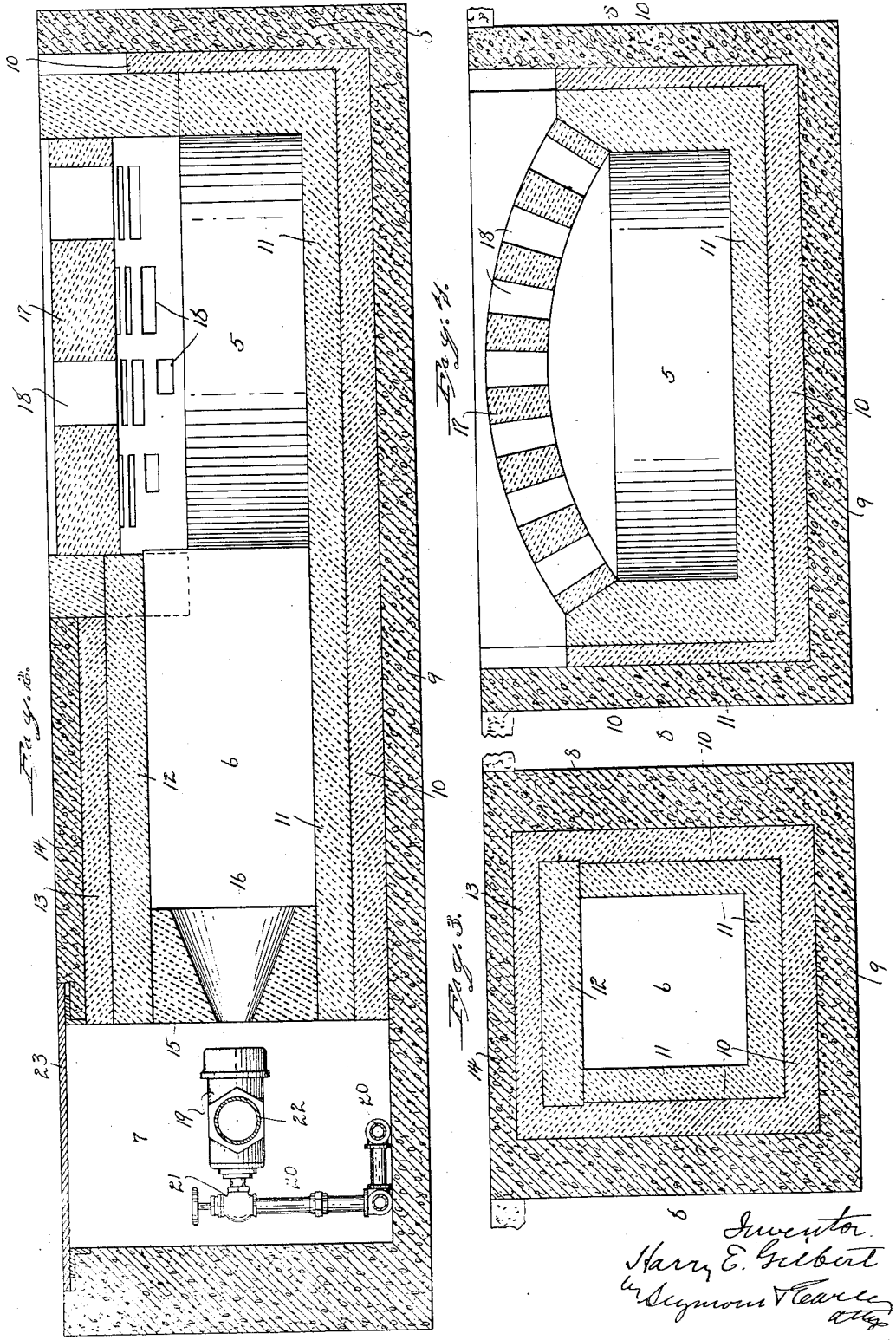

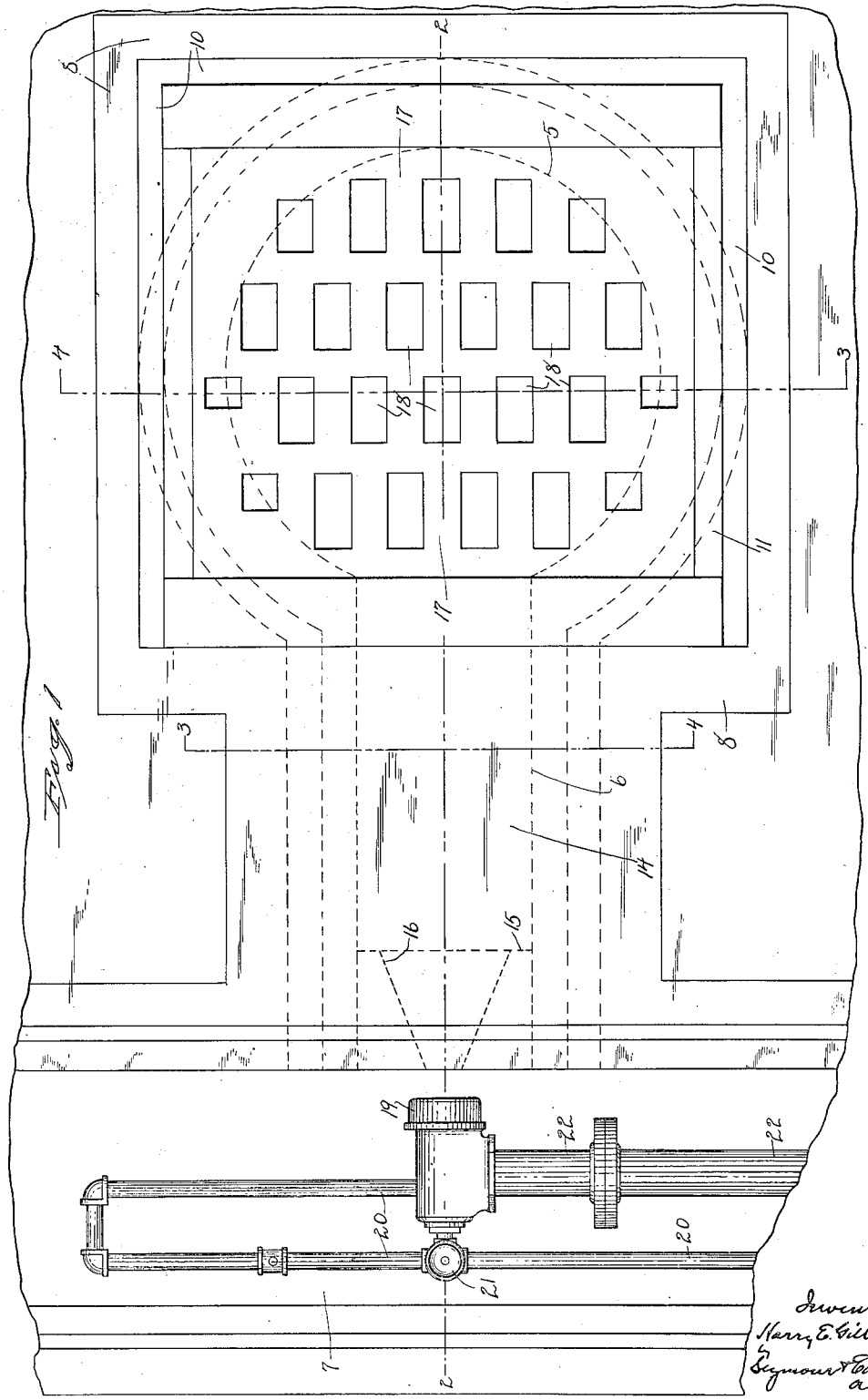

Patented Apr. 8, 1924.

1,489,757

UNITED STATES PATENT OFFICE.

HARRY E. GILBERT, OF BRIDGEPORT, CONNECTICUT.

VARNISH FIRE.

Application filed November 28, 1922. Serial No. 603,889.

*To all whom it may concern:*

Be it known that I, HARRY E. GILBERT, a citizen of the United States, residing at Bridgeport, in the county of Fairfield and State of Connecticut, have invented a new and useful Improvement in Varnish Fires; and I do hereby declare the following, when taken in connection with the accompanying drawings, and the characters of reference marked thereon, to be a full, clear, and exact description of the same, and which said drawings constitute part of this application, and represent, in—

Fig. 1, a plan view of a varnish fire constructed in accordance with my invention.

Fig. 2, a sectional view on the line 2—2 of Fig. 1.

Fig. 3, a sectional view on the line 3—3 of Fig. 2.

Fig. 4, a sectional view on the line 4—4 of Fig. 2.

This invention relates to improvements in varnish fires, that is, fires over which kettles may be placed in which varnish is formed by heating the usual gums. In the more general construction of varnish fires, the kettle stands over open flames, and it not infrequently occurs that the material in the kettle catches fire from the flames. The object of this invention is to provide a fire of incandescent character, so that the flames from the burner do not come in contact with the kettle, and the invention consists in the construction as hereinafter described and particularly recited in the claims.

In carrying out my invention, I employ a heating-chamber 5, combustion-chamber 6 forward of the heating-chamber, and trench 7 forward of the combustion-chamber, the combustion-chamber and heating chamber being arranged at a right angle to the trench 7, and the combustion-chamber is narrower than the heating-chamber. The walls 8 and bottom 9 are formed from cement, the inner ends, sides and bottom of the mixing-chamber and combustion-chamber are covered with silocel 10, and this is lined with siliceous material 11. The top 12 of the combustion-chamber 6 is covered with a slab of siliceous material, over which is a layer 13 of silocel, covered by a sheet 14 of concrete. In the outer end of the combustion-chamber is a throat 15 of siliceous material formed with a flaring mouth 16. Over the top of the heating chamber is an arch 17 of siliceous material arranged so as to form a series of passages 18. In the trench 7 is arranged an oil or gas burner 19 in line with the mouth 16, and this is fed from a suitable supply-pipe 20 controlled by a valve 21, and also entering the burner is an air-supply pipe 22, to provide the proper mixture. This trench is provided with a suitable cover 23.

It will be understood that these fires are arranged side by side, at suitable distances, and that the trench extends across the various fires, and the fires may be separated by partition walls in the usual manner.

The burner being lighted, flames are directed through the mouth 16 into the combustion-chamber 6, from which the heat passes to the heating-chamber 5 and heats the arch 17 to incandescence, so that, when the kettle is rolled into position over the arch, it will be heated to the desired extent without the possibility of the flames from the burner coming in contact with the kettle. I am thus enabled to produce a higher degree of heat than is possible with the open flame, and avoid the possibility of igniting the contents of the kettle.

The side-walls of concrete are sufficiently strong to permit a truck, carrying the kettle, to be rolled across them.

I claim:

1. A varnish fire, comprising a heating-chamber, provided with an arch of siliceous material having openings through it, a combustion-chamber forward of the heating-chamber opening into the heating-chamber, and a burner arranged outside the combustion-chamber to direct its flame into the said combustion-chamber.

2. A varnish fire, comprising a heating-chamber, a combustion-chamber forward of the heating-chamber into which it opens, a trench forward of and at right angles to the combustion-chamber and heating-chamber, said chambers being formed from concrete and lined with silocel and siliceous material, the combustion-chamber being provided with a mouth, a burner arranged in the trench in line with said mouth and adapted to direct the flames into the heating-chamber, from which the top of the heating-chamber is heated to incandescence.

3. A varnish fire, comprising a heating-chamber, a combustion-chamber forward of and narrower than the heating-chamber communicating therewith, a trench forward of and at right angles to the combustion-chamber, the heating-chamber being provided with an arched top of siliceous material formed with openings through it, said heating-chamber and combustion-chamber being lined with siliceous material, a throat at the outer end of the combustion-chamber having a tapered mouth, and a burner arranged in said trench in line with said mouth and adapted to direct the flame through said mouth into the combustion-chamber from which the top of the heating-chamber is heated to incandescence.

In testimony whereof, I have signed this specification in the presence of two subscribing witnesses.

HARRY E. GILBERT.

Witnesses:
H. L. GILBERT,
R. M. LELAND.